United States Patent
Hashimoto et al.

(10) Patent No.: US 11,920,024 B2
(45) Date of Patent: Mar. 5, 2024

(54) POLYMER COMPOSITION

(71) Applicant: SUMITOMO SEIKA CHEMICALS CO., LTD., Hyogo (JP)

(72) Inventors: Shun Hashimoto, Kako-gun (JP); Koji Fujita, Osaka (JP)

(73) Assignee: SUMITOMO SEIKA CHEMICALS CO., LTD., Hyogo (JP)

( * ) Notice: Subject to any disclaimer, the term of this patent is extended or adjusted under 35 U.S.C. 154(b) by 493 days.

(21) Appl. No.: 17/293,344

(22) PCT Filed: Dec. 12, 2018

(86) PCT No.: PCT/JP2018/045646
§ 371 (c)(1),
(2) Date: May 12, 2021

(87) PCT Pub. No.: WO2020/100315
PCT Pub. Date: May 22, 2020

(65) Prior Publication Data
US 2022/0010119 A1  Jan. 13, 2022

(30) Foreign Application Priority Data

Nov. 13, 2018 (JP) ................................ 2018-213223
Nov. 21, 2018 (JP) ................................ 2018-218381

(51) Int. Cl.
| | |
|---|---|
| C08L 29/04 | (2006.01) |
| C08L 1/28 | (2006.01) |
| H01M 4/139 | (2010.01) |
| H01M 4/62 | (2006.01) |
| H01M 10/05 | (2010.01) |
| H01M 50/443 | (2021.01) |
| C08F 216/06 | (2006.01) |
| C08F 218/08 | (2006.01) |

(52) U.S. Cl.
CPC ............... C08L 29/04 (2013.01); C08L 1/286 (2013.01); H01M 4/139 (2013.01); H01M 4/622 (2013.01); H01M 10/05 (2013.01); H01M 50/443 (2021.01); C08F 216/06 (2013.01); C08F 218/08 (2013.01); *C08L 2201/54* (2013.01)

(58) Field of Classification Search
CPC ....... C08L 29/04; C08L 1/286; C09D 129/04; C08F 216/06; C08F 220/06; C08F 218/08; C08F 220/14
See application file for complete search history.

(56) References Cited

U.S. PATENT DOCUMENTS

| | | | | |
|---|---|---|---|---|
| 5,525,444 | A | * 6/1996 | Ito .................. | H01M 4/621 |
| | | | | 429/217 |
| 2011/0003202 | A1 | 1/2011 | Wakizaka et al. | |
| 2015/0099156 | A1 | 4/2015 | Suzuki et al. | |
| 2015/0303463 | A1 | 10/2015 | Sasaki | |
| 2017/0256799 | A1 | 9/2017 | Sanuki et al. | |
| 2019/0055323 | A1 | 2/2019 | Kakubari et al. | |

FOREIGN PATENT DOCUMENTS

| | | |
|---|---|---|
| EP | 2 711 378 A1 | 3/2014 |
| EP | 3 016 180 A1 | 5/2016 |
| JP | H07-226205 A | 8/1995 |
| JP | H08-007896 A | 1/1996 |
| JP | H08-339808 A | 12/1996 |
| JP | H09-204917 A | 8/1997 |
| JP | H10-284082 A | 10/1998 |
| JP | 2001-283853 A | 10/2001 |
| JP | 2006-348138 A | 12/2006 |
| JP | 2009-191233 A | 8/2009 |
| JP | 2015-201267 A | 11/2015 |
| WO | 2009/107778 A1 | 9/2009 |
| WO | 2013/154196 A1 | 10/2013 |
| WO | 2014/073647 A1 | 5/2014 |
| WO | 2014/132935 A1 | 9/2014 |

(Continued)

OTHER PUBLICATIONS

Office Action dated Sep. 27, 2022 in Chinese Application No. 201880099426.3.

(Continued)

*Primary Examiner* — Mark S Kaucher
(74) *Attorney, Agent, or Firm* — Sughrue Mion, PLLC

(57) ABSTRACT

The present invention provides a method that enables the use of an aqueous solution of a copolymer of vinyl alcohol and an alkali metal neutralized product of ethylenically unsaturated carboxylic acid or carboxymethyl cellulose or a salt thereof, as a binder for secondary batteries, without causing a significant viscosity increase even if stored in the state of an aqueous solution. More specifically, the present invention provides a composition in the form of an aqueous solution containing a copolymer of vinyl alcohol and an alkali metal neutralized product of ethylenically unsaturated carboxylic acid and/or carboxymethyl cellulose or a salt thereof, wherein when the viscosity of the composition after being diluted with water (25° C. or less) to a viscosity of 200±100 mPa·s at room temperature (25° C.) and being adjusted to a temperature of 25° C. is defined as $X^{a1}$ (Pa·s), and the viscosity of the composition after being placed in an airtight container and being allowed to stand at 95° C. for 8 hours is defined as $X^{b1}$ (Pa·s), the change rate obtained by the following formula:

Change rate (%)=$(X^{a1}-X^{b1})/X^{b1} \times 100$ is 0 to 10%.

21 Claims, No Drawings

(56) References Cited

FOREIGN PATENT DOCUMENTS

WO  2016/031449 A1  3/2016
WO  2017/145904 A1  8/2017

OTHER PUBLICATIONS

International Search Report of PCT/JP2018/045646 dated Jan. 15, 2019 [PCT/ISA/210].

* cited by examiner

POLYMER COMPOSITION

CROSS REFERENCE TO RELATED APPLICATIONS

This application is a National Stage of International Application No. PCT/JP2018/045646 filed Dec. 12, 2018, claiming priority based on Japanese Patent Application No. 2018-213223 filed Nov. 13, 2018 and Japanese Patent Application No. 2018-218381 filed Nov. 21, 2018.

TECHNICAL FIELD

The present invention relates to a composition containing a specific polymer compound; and the like.

BACKGROUND ART

In recent years, along with the prevalence of portable electronic devices such as notebook computers, smartphones, mobile game devices, and PDAs (personal digital assistants), in order to reduce the weight of these devices and enable longer hours of use, downsizing and higher energy density have been required for secondary batteries that are used as their power source.

In particular, secondary batteries have also been increasingly used as a power source for vehicles, such as electric cars and electric motorcycles. Such secondary batteries that are also used as a power source for vehicles are required to not only achieve a higher energy density, but also be able to operate in a wide temperature range. Various secondary batteries (in particular, non-aqueous electrolyte secondary batteries) have been proposed.

As non-aqueous electrolyte secondary batteries, conventionally, nickel-cadmium batteries, nickel-hydrogen batteries, etc. have been mainly used; however, in recent years, there has been an increasing tendency to use lithium ion secondary batteries due to the above-described demands for downsizing and high energy density.

Electrodes of non-aqueous electrolyte secondary batteries, such as lithium ion secondary batteries, are usually produced by the following steps. A battery electrode mixture slurry, which is prepared by mixing either a solution of a binder for electrodes in a solvent or a dispersion of a binder for electrodes in a dispersion medium with an active material (an electrode active material) and a conductive auxiliary agent or the like, is applied to a current collector; and the solvent and the dispersion medium are then removed by a method such as drying (see Patent Literature (PTL 1)).

Similarly, non-aqueous electrolyte secondary battery separators are also usually produced by the following steps. A slurry, which is prepared by mixing either a solution of a binder for separators in a solvent or a dispersion of a binder for separators in a dispersion medium with filler particles or the like, is applied to a support; and the solvent and dispersion medium are then removed by a method such as drying (see Patent Literature (PTL) 2).

In the prior art, for example, a binder resin is dissolved in a solvent to form a binder composition, and this composition is used to produce electrodes or separators for non-aqueous electrolyte secondary batteries. However, such a binder composition is usually prepared at the time of use, and is not stored in a solution state for a long period of time.

CITATION LIST

Patent Literature

PTL 1: JPH10-284082A
PTL 2: WO2013/154196

SUMMARY OF INVENTION

Technical Problem

Various water-soluble or oil-soluble polymers are used as binders for secondary batteries (in particular, non-aqueous electrolyte secondary batteries) (in particular, binders for electrodes or binders for separators). Examples of water-soluble polymers include alkali metal acrylates, which are neutralization products, carboxymethyl cellulose or salts thereof, polyacrylic acid, and the like.

The present inventors found that when a copolymer of vinyl alcohol and an alkali metal neutralized product of ethylenically unsaturated carboxylic acid, or carboxymethyl cellulose or a salt thereof, (these may be hereinafter collectively referred to as "the specific polymer of the present invention") among such various water-soluble polymers used as binders for secondary batteries is dissolved in water and stored at room temperature in the form of an aqueous solution (that is, an aqueous binder solution), its viscosity significantly increases during storage. The inventors further found that if the viscosity increases, it may become difficult to apply the binder solution; or that even if the application of the binder solution is possible, various deficiencies, such as an uneven adhesive strength, are considered to likely occur, which makes it difficult to use the solution as a binder. The inventors further found that polyacrylic acid does not have such a significant viscosity increase, even when stored in the form of an aqueous solution at room temperature.

As described above, conventional binder compositions are usually prepared at the time of use, and are not stored in a solution state for a long period of time. In the prior art documents described above (PTL 1 and PTL 2) as well, the binder is not stored in the state of a binder composition for a long period of time. Thus, with respect to the specific polymer of the present invention, the problem of a significant increase in viscosity that occurs when the polymer is dissolved in water and stored in the form of an aqueous binder solution is not considered to have been found. Accordingly, in conventional techniques, there is no solution to this problem.

Therefore, the present inventors conducted extensive research in order to find a method that enables the use of an aqueous solution of a copolymer of vinyl alcohol and an alkali metal neutralized product of ethylenically unsaturated carboxylic acid and/or an aqueous solution of carboxymethyl cellulose or a salt thereof as a binder for secondary batteries, without causing a significant viscosity increase even if the solution is stored in an aqueous solution state (or in a slurry state prepared by adding, for example, an active substance and/or a filler to the aqueous solution).

Solution to Problem

The present inventors have found that in preparing an aqueous solution of the specific polymer of the present invention, if the polymer is dissolved under specific conditions, no significant viscosity increase occurs, even when stored at room temperature.

The present inventors further found that there is a correlation between the degree of significant viscosity increase of an aqueous solution of the specific polymer of the present invention during storage at room temperature and the viscosity change rate of the aqueous polymer solution obtained under specific conditions. The inventors found a possibility such that even if the aqueous polymer solution is not actually stored, whether a significant viscosity increase will occur during storage at room temperature can be ascertained by determining the viscosity change rate.

The present inventors conducted further research based on the above finding, and accomplished the present invention.

The present invention includes, for example, the subject matter itemized below. As described above, since the problem of the present invention has not been previously recognized, nothing that satisfies the features of the subject matter itemized below can be found in the prior art (for example, PTL 1 and PTL 2).

Item 1.

A composition in the form of an aqueous solution comprising a copolymer of vinyl alcohol and an alkali metal neutralized product of ethylenically unsaturated carboxylic acid and/or carboxymethyl cellulose or a salt thereof, wherein when the viscosity of the composition after being diluted with water (25° C. or less) to a viscosity of 200±100 mPa·s at room temperature (25° C.) and adjusted to a temperature of 25° C. is defined as $X^{a1}$ (Pa·s), and the viscosity of the composition after being placed in an airtight container and allowed to stand at 95° C. for 8 hours is defined as $X^{b1}$ (Pa·s), the change rate obtained by the following formula is 0 to 10%:

$$\text{Change rate } (0) = (X^{a1} - X^{b1})/X^{b1} \times 100.$$

Item 2.

A composition in the form of a slurry comprising:
   a copolymer of vinyl alcohol and an alkali metal neutralized product of ethylenically unsaturated carboxylic acid and/or carboxymethyl cellulose or a salt thereof;
   water; and
   an active substance and/or a filler,
wherein when the viscosity of the composition after being diluted with water (25° C. or less) to a viscosity of 1000±900 mPa·s at room temperature (25° C.) and adjusted to a temperature of 25° C. is defined as $X^{a2}$ (Pa·s), and the viscosity of the composition after being placed in an airtight container and allowed to stand at 95° C. for 8 hours is defined as $X^{b2}$ (Pa·s), the change rate obtained by the following formula is 0 to 10%:

$$\text{Change rate } (\%) = (X^{a2} - X^{b2})/X^{b2} \times 100.$$

Item 3.

(I)

A composition comprising:
   a copolymer of vinyl alcohol and an alkali metal neutralized product of ethylenically unsaturated carboxylic acid and/or carboxymethyl cellulose or a salt thereof;
   and
   water,
wherein when the viscosity of the composition after being adjusted to a temperature of 25° C. is defined as $X^c$ (Pa·s) and the viscosity of the composition after being placed in an airtight container after the adjustment to 25° C. and being allowed to stand at 25° C. for 3 days is defined as $X^d$ (Pa·s), the viscosity increase obtained by the following formula is 0 to 10%:

$$\text{Viscosity increase } (\%) = (X^d - X^c)/X^c \times 100; \text{ or}$$

(II)

the composition according to Item 1 or 2, which comprises:
   a copolymer of vinyl alcohol and an alkali metal neutralized product of ethylenically unsaturated carboxylic acid and/or carboxymethyl cellulose or a salt thereof;
   and
   water,
wherein when the viscosity of the composition after being adjusted to a temperature of 25° C. is defined as $X^c$ (Pa·s) and the viscosity of the composition after being placed in an airtight container after the adjustment to 25° C. and being allowed to stand at 25° C. for 3 days is defined as $X^d$ (Pa·s), the viscosity increase obtained by the following formula is 0 to 10':

$$\text{Viscosity increase } (\%) = (X^d - X^c)/X^c \times 100.$$

Item 4.

The composition according to Item 3, which is a composition in the form of an aqueous solution comprising a copolymer of vinyl alcohol and an alkali metal neutralized product of ethylenically unsaturated carboxylic acid and/or carboxymethyl cellulose or a salt thereof.

Item 5.

The composition according to Item 3, which is a composition in the form of a slurry comprising:
   a copolymer of vinyl alcohol and an alkali metal neutralized product of ethylenically unsaturated carboxylic acid and/or carboxymethyl cellulose or a salt thereof;
   water; and
   an active substance and/or a filler.

Item 6.

The composition according to Item 2 or 5, wherein the active material and/or the filler is at least one member selected from the group consisting of electrode active materials, inorganic fine particles, and organic fine particles.

Item 7.

The composition according to any one of Items 1 to 6, which is a binder composition for secondary batteries.

Item 8.

The composition according to Item 2, 5, or 6, which is an electrode mixture composition for secondary batteries or a separator composition for secondary batteries.

Item 9.

The composition according to any one of Items 1 to 8, wherein the copolymer of vinyl alcohol and an alkali metal neutralized product of ethylenically unsaturated carboxylic acid has a molar ratio of the vinyl alcohol to the alkali metal neutralized product of ethylenically unsaturated carboxylic acid in the copolymer in the range of 95/5 to 5/95.

Item 10.

The composition according to any one of Items 1 to 9, wherein the alkali metal neutralized product of ethylenically unsaturated carboxylic acid is an alkali metal acrylate and/or an alkali metal methacrylate.

Item 11.

The composition according to any one of Items 1 to 10, wherein the carboxymethyl cellulose has a degree of etherification of 0.8 to 1.2.

Advantageous Effects of Invention

According to the present invention, an aqueous solution of a copolymer of vinyl alcohol and an alkali metal neutralized product of ethylenically unsaturated carboxylic acid and/or an aqueous solution of carboxymethyl cellulose or a salt thereof can be used as a binder for secondary batteries, without incurring a significant viscosity increase even if stored in an aqueous solution state (or in the state of a slurry prepared by adding, for example, an active substance and/or a filler to the aqueous solution).

DESCRIPTION OF EMBODIMENTS

Embodiments that are included in the present invention are described in more detail below. The present invention preferably includes an aqueous solution composition or a slurry composition containing the specific polymer; and uses, production methods, etc. of the composition. However, the present invention is not limited thereto, and includes everything that is disclosed in the present specification and that can be recognized by persons skilled in the art.

The composition included in the present invention contains a copolymer of vinyl alcohol and an alkali metal neutralized product of ethylenically unsaturated carboxylic acid and/or carboxymethyl cellulose or a salt thereof. The composition included in the present invention may be hereinafter referred to as "the composition of the present invention."

In this specification, "A and/or B" means "A alone, B alone, or a combination of A and B."

The copolymer of vinyl alcohol and an alkali metal neutralized product of ethylenically unsaturated carboxylic acid can be obtained, for example, by copolymerizing vinyl ester and ethylenically unsaturated carboxylic acid ester (such as a block copolymer and/or a random copolymer), and saponifying the resulting copolymer in a mixed solvent of an aqueous organic solvent and water in the presence of an alkali, including alkali metal. Specifically, vinyl alcohol itself cannot be used as a monomer as is, because it is unstable; however, if a polymer obtained by using a vinyl ester as a monomer is saponified, the resulting polymer ends up with the same polymer as that obtained by polymerizing vinyl alcohol as a monomer.

Examples of vinyl esters include vinyl acetate, vinyl propionate, vinyl pivalate, and the like. Vinyl acetate is preferable because the saponification reaction readily proceeds. Such vinyl esters can be used singly, or in a combination of two or more.

Examples of the ethylenically unsaturated carboxylic acid ester include methyl ester, ethyl ester, n-propyl ester, isopropyl ester, n-butyl ester, and t-butyl ester of acrylic acid or methacrylic acid. Methyl acrylate and methyl methacrylate are preferable because the saponification reaction readily proceeds. Such ethylenically unsaturated carboxylic acid esters can be used singly, or in a combination of two or more.

If necessary, any other ethylenically unsaturated monomer copolymerizable with vinyl ester and ethylenically unsaturated carboxylic acid ester can be used in addition to the vinyl ester and ethylenically unsaturated carboxylic acid ester, and these can be copolymerized together. In the present invention, the copolymer in the form obtained by polymerizing vinyl alcohol as a monomer, which is obtained by saponifying the copolymer thus obtained, can also be used as a copolymer of vinyl alcohol and an alkali metal neutralized product of ethylenically unsaturated carboxylic acid.

As an example of the saponification reaction, a saponification reaction in which a vinyl acetate-methyl acrylate copolymer is 100; saponified with potassium hydroxide (KOH) is shown below.

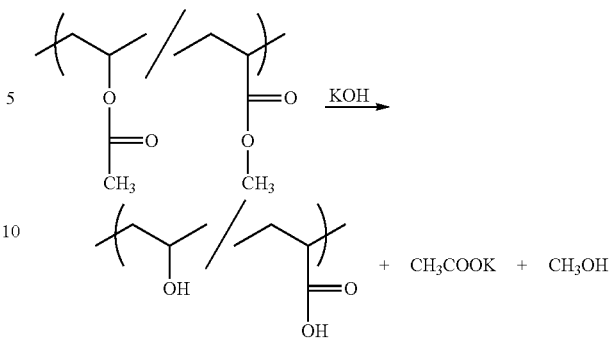

As shown above, the copolymer of vinyl alcohol and an alkali metal neutralized product of ethylenically unsaturated carboxylic acid is a material obtained by copolymerizing a vinyl ester and an ethylenically unsaturated carboxylic acid ester, and saponifying a monomer-derived ester moiety. The monomers are bound to each other by a C—C covalent bond.

In the copolymer, the molar ratio of the vinyl ester to the ethylenically unsaturated carboxylic acid ester (vinyl ester/ an alkali metal neutralized product of ethylenically unsaturated carboxylic acid) is preferably in the range of 95/5 to 5/95, more preferably 95/5 to 50/50, and even more preferably 90/10 to 60/40. When the molar ratio is within the range of 95/5 to 5/95, the polymer obtained after saponification has a holding power as a binder that is particularly preferably enhanced.

In the obtained copolymer of vinyl ester and an alkali metal neutralized product of ethylenically unsaturated carboxylic acid, the molar ratio of the vinyl ester to the alkali metal neutralized product of ethylenically unsaturated carboxylic acid in the copolymer is preferably in the range of 95/5 to 5/95, more preferably 95/5 to 50/50, and even more preferably 90/10 to 60/40.

The alkali metal neutralized product of ethylenically unsaturated carboxylic acid is preferably at least one member selected from the group consisting of alkali metal acrylates and alkali metal methacrylates. Examples of alkali metals of the alkali metal neutralized product of ethylenically unsaturated carboxylic acid include lithium, sodium, potassium, rubidium, cesium, and the like; and are preferably potassium and sodium. A particularly preferable alkali metal neutralized product of ethylenically unsaturated carboxylic acid is at least one member selected from the group consisting of sodium acrylate, potassium acrylate, sodium methacrylate, and potassium methacrylate.

A copolymer of vinyl ester and ethylenically unsaturated carboxylic acid ester, which is a precursor of the copolymer of vinyl alcohol and an alkali metal neutralized product of ethylenically unsaturated carboxylic acid, is preferably obtained by a suspension polymerization method in which monomers mainly comprising vinyl ester and ethylenically unsaturated carboxylic acid ester are polymerized in a suspended state in an aqueous dispersant solution containing a polymerization catalyst to form polymer particles, in view of obtaining the copolymer in a powder form.

Examples of the polymerization catalyst may include organic peroxides such as benzoyl peroxide and lauryl peroxide; and azo compounds such as azobisisobutyronitrile and azobisdimethylvaleronitrile. Lauryl peroxide is particularly preferable.

The amount of the polymerization catalyst is preferably 0.01 to 5 mass %, more preferably 0.05 to 3 mass %, and even more preferably 0.1 to 3 mass %, based on the total mass of the monomers.

The dispersant to be used for polymerization can be appropriately selected according to the types and amounts of monomers used, etc. Specific examples include water-soluble polymers such as polyvinyl alcohols (partially saponified polyvinyl alcohol and fully saponified polyvinyl alcohol), poly(meth)acrylic acid and salts thereof, and polyvinylpyrrolidone; water-insoluble inorganic compounds such as calcium phosphate and magnesium silicate; and the like. These dispersants can be used singly, or in a combination of two or more.

The amount of the dispersant to be used may vary depending on the types of monomers used etc.; and is preferably 0.01 to 10 mass %, and more preferably 0.05 to 5 mass %, based on the total mass of the monomers used.

Further, water-soluble salts of alkali metals, alkali earth metals, etc. can also be added in order to adjust the surfactant effect of the dispersant or the like. Examples include sodium chloride, potassium chloride, calcium chloride, lithium chloride, anhydrous sodium sulfate, potassium sulfate, disodium hydrogen phosphate, dipotassium hydrogen phosphate, trisodium phosphate, tripotassium phosphate, and the like. These water-soluble salts can be used singly, or in a combination of two or more.

The amount of the water-soluble salt to be used may vary depending on the type and amount of dispersant used etc.; however, it is usually 0.01 to 10 mass %, based on the mass of the aqueous dispersant solution.

The temperature at which the monomers are polymerized is preferably $-20°$ C. to $+20°$ C., and more preferably $-10°$ C. to $+10°$ C., relative to the 10-hour half-life temperature of the polymerization catalyst. For example, the 10-hour half-life temperature of lauryl peroxide is about 62° C.

The time of polymerizing the monomers may vary depending on the type and amount of polymerization catalyst used, polymerization temperature, etc.; and is usually from a few hours to several tens of hours.

After completion of the polymerization reaction, the copolymer is separated by a method such as centrifugation or filtration, and is obtained in the form of a wet cake. The copolymer obtained in the form of a wet cake can be subjected to a saponification reaction either as is or after being dried, if necessary.

The number average molecular weight of the polymer referred to herein is a value determined by a molecular weight measuring device equipped with a GFC column (e.g., OHpak, produced by Shodex), using DMF as a solvent. Examples of such molecular weight measuring devices include Alliance 2695 HPLC System and a 2414 RI Detector by Waters Corporation.

The copolymer before saponification preferably has a number average molecular weight of 10000 to 1000000, and more preferably 50000 to 800000.

The saponification reaction can be performed, for example, in the presence of an alkali including alkali metal in an aqueous organic solvent alone, or in a mixed solvent of an aqueous organic solvent and water. Examples of alkalis including alkali metal that can be used in the saponification reaction include known alkalis, and are preferably alkali metal hydroxides. In view of high reactivity, sodium hydroxide and potassium hydroxide are particularly preferable.

The amount of the alkali to be used is preferably 60 to 140 mol %, and more preferably 80 to 120 mol %, based on the total number of moles of the monomers.

For the saponification reaction, an aqueous organic solvent alone, or a mixed solvent of an aqueous organic solvent and water, is preferably used. Examples of the aqueous organic solvent include lower alcohols such as methanol, ethanol, n-propanol, isopropanol, n-butanol, and t-butanol; ketones such as acetone and methyl ethyl ketone; mixtures of these substances; and the like. Among these aqueous organic solvents, lower alcohols are suitable; and methanol and ethanol are particularly preferable, because the resulting copolymer of vinyl alcohol and an alkali metal neutralized product of ethylenically unsaturated carboxylic acid has an excellent binding effect and excellent resistance to mechanical shear.

The mass ratio of the aqueous organic solvent to water in the mixed solvent of an aqueous organic solvent and water is preferably in the range of 30/70 to 85/15, more preferably 40/60 to 85/15, and even more preferably 40/60 to 80/20. When the copolymer obtained in the form of a wet cake is subjected to a saponification reaction as is, the mass ratio of the aqueous organic solvent to water is a mass ratio calculated by including water in the copolymer in the form of a wet cake.

The temperature at which the copolymer of vinyl ester and ethylenically unsaturated carboxylic acid ester is saponified may vary depending on the molar ratio of the monomers; and is preferably, for example, 20 to 60° C., and more preferably 20 to 50° C.

The saponification reaction time may vary depending on the type and amount of alkali used etc., and is usually completed in about several hours.

The degree of saponification is preferably 90 to 100%, and more preferably 95 to 100%. The lower limit of the range of the degree of saponification may be 91%, 92%, 93%, 94%, or 95%. When the degree of saponification is set to 90% or more, the solubility in water can be improved.

Upon completion of the saponification reaction, a dispersion of a saponified copolymer in the form of a paste or slurry is usually obtained. The obtained dispersion is separated into a solid and a liquid by a conventionally known method, such as centrifugation or filtration; the obtained product is washed well with a lower alcohol, such as methanol; and the resulting liquid-containing saponified copolymer is dried, whereby a saponified copolymer, which is a copolymer of vinyl alcohol and an alkali metal neutralized product of ethylenically unsaturated carboxylic acid, can be obtained in the form of spherical single particles or aggregate particles formed by aggregation of spherical particles.

During or after the saponification reaction, the saponified copolymer is acidized using an acid, for example, an inorganic acid such as hydrochloric acid, sulfuric acid, phosphoric acid, or nitric acid; or an organic acid such as formic acid, acetic acid, oxalic acid, or citric acid; and then different types of copolymers of vinyl alcohol and an alkali metal neutralized product of ethylenically unsaturated carboxylic acid (i.e., copolymers that are different in alkali metal) can also be obtained using any alkali metals, such as lithium hydroxide, sodium hydroxide, potassium hydroxide, rubidium hydroxide, cesium hydroxide, and francium hydroxide.

The conditions in which the liquid-containing saponified copolymer is dried are not particularly limited. In general, liquid-containing saponified copolymer is preferably dried under normal pressure or reduced pressure, at a temperature of 30 to 120° C.

The drying time may vary depending on the pressure and temperature during drying, and is usually from a few hours to several tens of hours.

Carboxymethyl cellulose (CMC) is one type of cellulose derivative; and is synthesized by reacting, for example, wood pulp, linter pulp, or the like as a starting material with monochloroacetic acid or the like. In the synthesis method, a polar carboxyl group solubilizes cellulose, and makes the cellulose easier to chemically react. The introduction rate of monochloroacetic acid or the like into cellulose is represented by the "degree of etherification." A relatively high degree of etherification in carboxymethyl cellulose is preferable. Specifically, the carboxymethyl cellulose preferably has a degree of etherification of 0.5 or more, more preferably 0.6 or 0.7 or more, and still more preferably 0.8 or more.

Preferable examples of the salt of carboxymethyl cellulose include a sodium salt and a potassium salt (that is, sodium carboxymethyl cellulose and potassium carboxymethyl cellulose). Sodium carboxymethyl cellulose is particularly preferable.

The "copolymer of vinyl alcohol and an alkali metal neutralized product of ethylenically unsaturated carboxylic acid and/or carboxymethyl cellulose or a salt thereof" is synonymous with "at least one member selected from the group consisting of copolymers of vinyl alcohol and an alkali metal neutralized product of ethylenically unsaturated carboxylic acid and carboxymethyl cellulose or salts thereof." Such copolymers of vinyl alcohol and an alkali metal neutralized product of ethylenically unsaturated carboxylic acid can be used singly, or in a combination of two or more. Carboxymethyl cellulose or salts thereof can also be used singly, or in a combination of two or more. Either the copolymer of vinyl alcohol and an alkali metal neutralized product of ethylenically unsaturated carboxylic acid, or carboxymethyl cellulose or a salt thereof, can be used; or both can be used in a combination.

The composition of the present invention may contain an active material and/or a filler in addition to the specific polymer of the present invention. When an active material and/or a filler is contained, the composition is preferably a slurry composition.

The active material is preferably an electrode (positive electrode or negative electrode) active material. The composition of the present invention containing an active material can be preferably used, for example, as an electrode mixture composition for secondary batteries (in particular, non-aqueous electrolyte secondary batteries).

As positive electrode active materials, those used in the technical field to which the present invention pertains can be used. Examples of preferable positive electrode active materials include lithium iron phosphate ($LiFePO_4$), lithium manganese phosphate ($LiMnPO_4$), lithium cobalt phosphate ($LiCoPO_4$), iron pyrophosphate ($Li_2FeP_2O_7$), lithium cobaltate composite oxide ($LiCoO_2$), spinel-type lithium manganese composite oxide ($LiMn_2O_4$), lithium manganese composite oxide ($LiMnO_2$), lithium nickel composite oxide ($LiNiO_2$), lithium niobium composite oxide ($LiNbO_2$), lithium iron composite oxide ($LiFeO_2$), lithium magnesium composite oxide ($LiMgO_2$), lithium calcium composite oxide ($LiCaO_2$), lithium copper composite oxide ($LiCuO_2$), lithium zinc composite oxide ($LiZnO_2$), lithium molybdenum composite oxide ($LiMoO_2$), lithium tantalum composite oxide ($LiTaO_2$), lithium tungsten composite oxide ($LiWO_2$), lithium-nickel-cobalt-aluminum composite oxide ($LiNi_{0.8}Co_{0.15}Al_{0.05}O_2$), lithium-nickel-cobalt-manganese composite oxide ($LiNi_{0.33}Co_{0.33}Mn_{0.33}O_2$, Li-rich nickel-cobalt-manganese composite oxide ($Li_xNi_aCo_nMn_cO_2$ solid solution), manganese nickel oxide ($LiNi_{0.5}Mn_{1.5}O_4$), manganese oxide ($MnO_2$), vanadium-based oxides, sulfur-based oxides, silicate-based oxides, and the like. These positive electrode active materials can be used singly, or in a combination of two or more.

As negative electrode active materials, for example, materials usually used in a lithium ion secondary battery can be used. Specific examples include Li, Na, C (e.g., black lead, graphite, etc.), Mg, Al, Si, P, K, Ca, Sc, Ti, V, Cr, Mn, Fe, Co, Ni, Cu, Zn, Ga, Ge, Y, Zr, Nb, Mo, Pd, Ag, Cd, In, Sn, Sb, W, Pb, Bi, alloys, oxides, chalcogenides, halides, and the like using these elements. These negative electrode active materials can be used singly, or in a combination of two or more.

Preferable examples of the filler include inorganic fine particles and organic fine particles (filler particles). The composition of the present invention containing a filler can be preferably used, for example, as a composition for secondary battery (particularly a non-aqueous electrolyte secondary battery) separators. That is, since the composition contains a binder (the specific polymer of the present invention) and a filler, the composition is useful for providing the separator with a filler.

Examples of inorganic fine particles include fine particles containing calcium carbonate, talc, clay, kaolin, silica, hydrotalcite, diatomaceous earth, magnesium carbonate, barium carbonate, calcium sulfate, magnesium sulfate, barium sulfate, aluminum hydroxide, magnesium hydroxide, calcium oxide, magnesium oxide, titanium oxide, alumina, mica, zeolite, glass, and the like. Examples of organic fine particles include fine particles containing homopolymers of styrene, vinyl ketone, acrylonitrile, methyl methacrylate, ethyl methacrylate, glycidyl methacrylate, glycidyl acrylate, methyl acrylate, and the like, or copolymers of two or more thereof; fluorine-based resins such as polytetrafluoroethylene, an ethylene tetrafluoride-propylene hexafluoride copolymer, an ethylene tetrafluoride-ethylene copolymer, and polyvinylidene fluoride; melamine resins; urea resins; polyethylene; polypropylene; polymethacrylate; and the like. Two or more kinds of fine particles, or the same kind of fine particles having different particle size distributions, can be mixed and used as filler particles. Among these, alumina is particularly preferable as filler particles.

The composition of the present invention is preferably (0) a composition in the form of an aqueous solution containing a copolymer of vinyl alcohol and an alkali metal neutralized product of ethylenically unsaturated carboxylic acid, or carboxymethyl cellulose or a salt thereof;

(i) a composition in the form of an aqueous solution containing a copolymer of vinyl alcohol and an alkali metal neutralized product of ethylenically unsaturated carboxylic acid;

(ii) a composition in the form of an aqueous solution containing carboxymethyl cellulose or a salt thereof; or (iii) a composition in the form of a slurry containing an active material and/or a filler, in addition to the specific polymer of the present invention and water.

These compositions may be hereinafter referred to as composition (0), composition (i), composition (ii), and composition (iii).

When a copolymer of vinyl alcohol and an alkali metal neutralized product of ethylenically unsaturated carboxylic acid, or carboxymethyl cellulose or a salt thereof is dissolved in water to form an aqueous solution composition (or a slurry composition further containing an active material and/or a filler in addition to the aqueous solution) and the obtained aqueous solution composition (or slurry composition) is stored at room temperature, a significant viscosity increase usually occurs during storage. However, compositions that are within the scope of the present invention are inhibited from such a significant viscosity increase. For example, even if the composition (0), composition (i), or composition (ii) is stored in the form of an aqueous solution composition as is, or even if composition (iii) is stored in the form of a slurry composition, the composition is inhibited from a significant viscosity increase during storage.

More specifically, when the viscosity of the composition whose temperature is adjusted to 25° C. is defined as $X^c$ (Pa·s) and the viscosity of the composition that is placed in an airtight container after the adjustment to 25° C. and then allowed to stand at 25° C. (for example, in a 25° C. thermostatic bath) for 3 days is defined as $X^d$ (Pa·s), the viscosity increase obtained by the following formula is 0 to 10%.

Viscosity increase (%)=$(X^d-X^c)/X^c \times 100$.

The upper limit of the viscosity increase range is preferably 9.5%, 9%, 8.5%, 8%, 7.5%, or 7%; and more preferably 6.5%, 6%, 5.5%, 5%, 4.5%, 4%, 3.5%, or 3%.

When the "change rate" described in detail below is 0 to 10, the composition of the present invention is most likely to achieve a viscosity increase within the range described above. Accordingly, the composition of the present invention can also be specified by the "change rate," instead of the viscosity increase. Whether the composition is inhibited from a significant viscosity increase or not can, of course, be determined by using the viscosity increase as an index. Whether the composition is inhibited from a significant viscosity increase or not can also be determined by using the "change rate" as an index, even if the composition is not actually stored. The present invention preferably also includes this determination method.

The composition (0), composition (i), and composition (ii) are preferably compositions wherein when the viscosity of the composition after being diluted with water to a viscosity of 200±100 mPa·s at room temperature and being adjusted to a temperature of 25° C. is defined as $X^{a1}$ (Pa·s), and the viscosity of the composition after being placed in an airtight container and being allowed to stand at 95° C. for 8 hours is defined as $X^{b1}$ (Pa·s), the change rate obtained by the following formula is 0 to 10%.

Change rate (%)=$(X^{a1}-X^{b1})/X^{b1} \times 100$

The upper limit of the change rate is preferably 9.5%, 9%, 8.5%, 8%, 7.5%, 7%, 6.5%, 6%, 5.5%, 5%, 4.5%, 4%, 3.5%, 3%, 2.5%, 2%, 1.5%, or 1%. The room temperature refers to 25° C., and the temperature of the water used for dilution is 25° C. or less. The water temperature is not particularly limited; however, it is preferably, for example, about 15 to 25° C. The phrase "diluting with water to a viscosity of 200±100 mPa·s" means that the composition is uniformly diluted with water to adjust the viscosity to 200±100 mPa·s. For uniform dilution, operations such as mixing and/or stirring can be used.

The composition (iii) is preferably a composition wherein when the viscosity of the composition after being diluted with water to a viscosity of 1000±900 mPa·s at room temperature and being adjusted to a temperature of 25° C. is defined as $X^{a2}$ (Pa·s), and the viscosity of the composition after being placed in an airtight container and being allowed to stand at 95° C. for 8 hours is defined as $X^{b2}$ (Pa·s), the change rate obtained by the following formula is 0 to 10%.

Change rate (%)=$(X^{a2}-X^{b2})/X^{b2} \times 100$

The upper limit of the change rate is preferably 9.5%, 9%, 8.5%, 8%, 7.5%, 7%, 6.5%, 6%, 5.5%, 5%, 4.5%, 4%, 3.5%, 3%, 2.5%, 2%, 1.5%, or 1%. The room temperature refers to 25° C., and the temperature of the water used for dilution is 25° C. or less. The water temperature is not particularly limited; however, it is preferably, for example, about 15 to 25° C. Diluting with water to a viscosity of 1000±900 mPa·s means that the composition is uniformly diluted with water to adjust the viscosity to 1000±900 mPa·s. For uniform dilution, operations such as mixing and/or stirring can be performed.

The viscosities used to calculate the change rate and the viscosity increase are values obtained by using a B-type viscometer (LV-type, produced by Brookfield), spindle No. Lv-4, 30 rpm (liquid temperature: 25° C.).

As long as the effect of the present invention is not impaired, the composition of the present invention preferably contains components in the following amounts. The contents of the copolymer of vinyl alcohol and an alkali metal neutralized product of ethylenically unsaturated carboxylic acid and water in composition (i) are such that the mass ratio of the copolymer of vinyl alcohol and an alkali metal neutralized product of ethylenically unsaturated carboxylic acid to water is preferably, for example, the mass ratio of copolymer:water=about 1:5 to 1:15, more preferably about 1:6 to 1:14, about 1:6 to 1:13, or about 1:6 to 1:12; even more preferably about 1:7 to 1:11; and still even more preferably about 1:8 to 1:10. The contents of carboxymethyl cellulose or a salt thereof and water in the composition (ii) are such that the mass ratio of carboxymethyl cellulose or a salt thereof to water is preferably, for example, about 1:5 to 1:15; more preferably about 1:6 to 1:14, about 1:6 to 1:13, or about 1:6 to 1:12; even more preferably about 1:7 to 1:11; and still even more preferably about 1:8 to 1:10. Further, the contents of the copolymer of vinyl alcohol and an alkali metal neutralized product of ethylenically unsaturated carboxylic acid and water and the contents of carboxymethyl cellulose or a salt thereof and water in the composition (0) and the composition (iii) may be the same as those in the composition (i) and the composition (ii). Alternatively, the mass ratio of the specific polymer of the present invention: water may be in the range of about 1:10 to 1:30, about 1:15 to 1:25, or about 1:17 to 1:23. The content of the active material and/or the filler in composition (iii) depends on the kind of active material and/or filler; however, the ratio of the active material and/or the filler to water is preferably in the range of about 1:0.5 to 1:1.5, and more preferably about 1:0.7 to 1:1.3 (particularly when graphite is contained as an active material).

In order to prepare a composition having the viscosity increase and the change rate described above, when the specific polymer of the present invention is dissolved in water to form an aqueous solution composition, the temperature of the composition is adjusted to 85° C. or higher. The polymer is preferably dissolved by stirring at this temperature for 1 hour or more. The stirring time and conditions can be appropriately set; however, the time is preferably 1 hour or more. As described above, the temperature of the composition is 85° C. or more; preferably 86° C., 87° C., 88° C., or 89° C. or more; and more preferably 90° C., 91° C., 92° C., 93° C., 94° C., or 95° C. or more. The time is more preferably 2 hours or more; and even more preferably 2.5, 3, 3.5, 4, 4.5, 5, 5.5, 6, 6.5, 7, 7.5, or 8 hours or more. The stirring can be performed using, for example, a known stirrer. The stirring speed and the like can be appropriately set.

The composition of the present invention having the above-described formulation can be easily obtained by mixing components in amounts to achieve the above contents of the components at the time of dissolution (preferably during stirring). When the composition of the present invention containing an active material and/or a filler is to be prepared, the active material and/or the filler can also be added and mixed at the time of dissolution (preferably during stirring). Alternatively, after the specific polymer of the present invention is dissolved in water by adjusting the temperature of the composition to 85° C. or more as described above (preferably with stirring for 1 hour or more), the active material and/or the filler may be further added and mixed, which is preferable.

Examples of preferable methods for producing the composition of the present invention include the following methods:

as a preferable method for producing the composition (0), the composition (i), or the composition (ii), a method of producing a composition in the form of an aqueous solution containing a copolymer of vinyl alcohol and an alkali metal neutralized product of ethylenically unsaturated carboxylic acid and/or carboxymethyl cellulose or a salt thereof, the method comprising mixing a copolymer of vinyl alcohol and an alkali metal neutralized product of ethylenically unsaturated carboxylic acid or carboxymethyl cellulose or a salt thereof with water, wherein the mixing is performed by stirring for 1 hour or more, and the mixture is maintained at a temperature of 85° C. or more during the stirring; and as a method for producing the composition (iii), a method for producing a composition in the form of a slurry containing a copolymer of vinyl alcohol and an alkali metal neutralized product of ethylenically unsaturated carboxylic acid and/or carboxymethyl cellulose or a salt thereof, water, and an active substance and/or a filler, the method comprising the steps of:

(α) mixing a copolymer of vinyl alcohol and an alkali metal neutralized product of ethylenically unsaturated carboxylic acid and/or carboxymethyl cellulose or a salt thereof with water; and (β) mixing an active material and/or a filler with the other starting materials of the composition, wherein the mixing in step (α) is performed by stirring for 1 hour or more, and the mixture is maintained at a temperature of 85° C. or more during the stirring.

The order of steps (α) and (β) in the method is not particularly limited. For example, step (α) can be first performed and then the obtained mixture can be used to perform step (β). Alternatively, steps (α) and (β) can be performed simultaneously.

As long as the effect of the present invention is not impaired, the composition of the present invention may further contain other polymers. Preferable examples of such other polymers are polymers known as binders for secondary batteries. Specific examples include acrylic resins such as polyacrylic acid, sodium polyacrylate, polyacrylic acid salts; sodium alginate, polyimide (PI), polytetrafluoroethylene (PTFE), polyamide, polyamideimide, styrene butadiene rubber (SBR), polyvinyl alcohol (PVA), ethylene-acetic acid copolymer (EVA), and the like. Other examples include vinyl ester, acrylic acid ester, methacrylic acid ester; and resins containing any one, or two or more, of these esters in the structure. These other polymers can be used singly, or in a combination of two or more. The content of such other polymers in the composition can be appropriately set within the range that the effect of the present invention is not impaired. For example, the content of other polymers can be 0% (that is, no other polymers are contained); or can be 1, 2, 3, 4, 5, 6, 7, 8, 9, or 10 mass % or less.

In the present specification, the term "comprising," "including," or "containing" includes the concepts of "consisting essentially of" and "consisting of." Further, the present invention includes any and all combinations of the features described herein.

Various characteristics (properties, structures, functions, etc.) described in the above embodiments of the present disclosure may be combined in any manner to specify the subject matter included in the present invention. That is, the present invention includes all of the subject matter comprising any combination of the combinable properties described herein.

EXAMPLES

The present invention is described in more detail below with reference to Examples and Comparative Examples. However, the present invention is not limited to these Examples.

Production of Copolymer of Vinyl Alcohol and an Alkali Metal Neutralized Product of Ethylenically Unsaturated Carboxylic Acid

Production Example 1: Synthesis of Copolymer of Vinyl Ester and Ethylenically Unsaturated Carboxylic Acid Ester 768 g of water and 12 g of anhydrous sodium sulfate were placed in a 2-L reaction vessel equipped with a stirrer, a thermometer, an $N_2$ gas inlet tube, a reflux condenser, and a dropping funnel; and $N_2$ gas was blown into the vessel to remove oxygen from the system. Subsequently, 1 g of partially saponified polyvinyl alcohol (saponification degree: 885) and 1 g of lauryl peroxide were added, followed by heating to an internal temperature of 60° C. Thereafter, 51 g (0.6 mol) of methyl acrylate and 206.4 g (2.4 mol) of vinyl acetate were added thereto dropwise through a dropping funnel over 4 hours. The internal temperature was then maintained at 65° C. for 2 hours to complete the reaction (the molar ratio of methyl acrylate to vinyl acetate used was about 20:80). Subsequently, the solids were separated by filtration to obtain 287 g of a vinyl acetate-methyl acrylate copolymer (water content: 10.0%).

Production Example 2: Synthesis of Saponified Copolymer of Vinyl Ester and Ethylenically Unsaturated Carboxylic Acid Ester 450 g of methanol, 420 g of water, 132 g (3.3 mol) of sodium hydroxide, and 287 g (water content: 10.0 mass %) of the water-containing copolymer obtained in Production Example 1 were placed in the same reaction vessel as above. A saponification reaction was allowed to proceed with stirring at 30° C. for 3 hours. After completion of the saponification reaction, the obtained saponified copolymer was washed with methanol, filtered, and then dried at 70° C. for 6 hours to obtain 170 g of a saponified copolymer of vinyl acetate and methyl acrylate (which can also be referred to as a copolymer of vinyl alcohol and a neutralization product sodium acrylate; and may be hereinafter referred to as the "copolymer").

Example 1

890 g of water and 110 g of the copolymer obtained in Production Example 2 (water content: 9 mass %) were placed into a 2-L reaction vessel equipped with a stirrer, a thermometer, and a reflux condenser; and stirred at an internal temperature of 90° C. for 3 hours. The resulting reaction mixture was then cooled to room temperature to obtain an aqueous solution A.

The internal temperature means the temperature in the reaction vessel. More specifically, the internal temperature means the temperature of the composition contained in the reaction vessel.

Example 2

An aqueous solution B was obtained in the same manner as in Example 1, except that the stirring time was set to 8 hours.

Example 3

An aqueous solution C was obtained in the same manner as in Example 1, except that the stirring temperature (internal temperature) was set to 85° C.

Example 4

An aqueous solution D was obtained in the same manner as in Example 2, except that the stirring temperature (internal temperature) was set to 85° C.

Example 5

An aqueous solution E was obtained in the same manner as in Example 1, except that the stirring temperature (internal temperature) was set to 95° C.

Example 6

An aqueous solution F was obtained in the same manner as in Example 1, except that 945 g of water and 55 g of the copolymer (water content: 9 mass) were used.

Example 7

An aqueous solution G was obtained in the same manner as in Example 5, except that carboxymethyl cellulose (produced by Daicel FineChem Ltd.: 1220) was used instead of the copolymer.

Example 8

1567.5 mg of graphite particles (produced by Hitachi Chemical Co., Ltd.: MAG-D), 907.5 mg of water, and 825.0 mg of aqueous solution A were mixed with a planetary centrifugal mixer (Awatori Rentaro, produced by Thinky Corporation) at room temperature for 30 minutes to obtain a slurry A.

Comparative Example 1

An aqueous solution H was obtained in the same manner as in Example 1, except that the stirring temperature (internal temperature) was 80° C.

Comparative Example 2

An aqueous solution I was obtained in the same manner as in Example 1, except that the stirring temperature (internal temperature) was 80° C. and the stirring time was 8 hours.

Comparative Example 3

An aqueous solution J was obtained in the same manner as in Example 5, except that the stirring temperature (internal temperature) was 80° C.

Comparative Example 4

An aqueous solution K was obtained in the same manner as in Example 1, except that the stirring temperature (internal temperature) was 70° C. and the stirring time was 8 hours.

Comparative Example 5

An aqueous solution L was obtained in the same manner as in Example 1, except that the stirring temperature (internal temperature) was 60° C. and the stirring time was 8 hours.

Comparative Example 6

An aqueous solution M was obtained in the same manner as in Example 6, except that the stirring temperature (internal temperature) was 25° C.

Reference Example 1

An aqueous solution N was obtained in the same manner as in Example 1, except that polyacrylic acid (produced by Wako Pure Chemical Industries, Ltd.) was used instead of the copolymer, and the stirring temperature (internal temperature) was set to 25° C.

Reference Example 2

An aqueous solution O was obtained in the same manner as in Example 1, except that polyacrylic acid (produced by Wako Pure Chemical Industries, Ltd.) was used instead of the copolymer.

Comparative Example 7

1567.5 mg of graphite particles (produced by Hitachi Chemical Co., Ltd.: MAG-D), 1640.8 mg of water, and 92 mg of the copolymer were mixed with a planetary centrifugal mixer (Awatori Rentaro, produced by Thinky Corporation) at room temperature for 30 minutes to obtain a slurry B.

Evaluation

The change rate and viscosity increase of the aqueous solution or slurry composition obtained in each example were measured by the following methods. Table 1 shows the results.

1. Measurement of Change Rate

The compositions containing only a polymer and water were measured for viscosity a and viscosity b as follows. The viscosity a was determined after water (25° C. or less) was added to achieve a viscosity of 200±100 mPa·s, and the composition was uniformly diluted and the temperature of the composition was adjusted to 25° C. The viscosity b was determined after an aqueous solution of the composition prepared in the same manner was placed in an airtight container so as not to volatize the aqueous solution, and immersed in an oil bath at 95° C. for 8 hours, and then cooled to 25° C. The "change rate" was calculated by the formula shown below.

The composition containing an active material and/or a filler in addition to the polymer and water was measured for viscosity a and viscosity b as follows. The viscosity a was determined after water (25° C. or less) was added to achieve a viscosity of 1000±900 mPa·s, and the composition was uniformly diluted and the temperature of the composition was adjusted to 25° C. The viscosity b was determined after an aqueous solution prepared in the same manner was placed in an airtight container so as not to volatize the composition, and immersed in an oil bath at 95° C. for 8 hours, and then cooled to 25° C. The "change rate" was calculated by the following formula.

Change rate (%)=(a−b)/b×100

2. Measurement of Viscosity Increase

Viscosity c was determined after an aqueous solution composition or a slurry composition was prepared and adjusted to 25° C. Viscosity d was determined after the aqueous solution composition or the slurry composition was adjusted to 25° C. and then stored (allowed to stand) in a 25° C. thermostatic bath for 3 days. The "viscosity increase" was calculated by the following formula.

Viscosity increase (%)=(d−c)/c×100

The viscosities used to calculate the change rate and the viscosity increase were values measured using a Brookfield viscometer (LV-type, produced by Brookfield), spindle No. Lv-4, at 30 rpm (liquid temperature 25° C.).

Table 1 shows the results. When the copolymer or carboxymethyl cellulose was used, the viscosity increase correlated well with the change rate. That is, compositions whose viscosity significantly increased during storage also had a significantly increased change rate, whereas compositions that were inhibited from viscosity increase also had a low change rate. The results of evaluation in which compositions having a viscosity increase of 10% or less were evaluated as A and compositions having a viscosity increase of more than 10% were evaluated as B were consistent with the results of an evaluation in which compositions having a change rate of 10% or less were evaluated as A, and compositions having a change rate of more than 10% were evaluated as B (Table 1).

The results thus show that even when the change rate is used instead of the viscosity increase, whether the viscosity will significantly increase during storage can be determined.

TABLE 1

| | Polymer | Sample | Change rate | Viscosity increase | Evaluation |
|---|---|---|---|---|---|
| Example 1 | Copolymer | Aqueous solution A | 0.0% | 0.7% | A |
| Example 2 | Copolymer | Aqueous solution B | 1.2% | 0.0% | A |
| Example 3 | Copolymer | Aqueous solution C | 8.5% | 9.0% | A |
| Example 4 | Copolymer | Aqueous solution D | 2.5% | 2.7% | A |
| Example 5 | Copolymer | Aqueous solution E | 0.0% | 0.0% | A |

TABLE 1-continued

| | Polymer | Sample | Change rate | Viscosity increase | Evaluation |
|---|---|---|---|---|---|
| Example 6 | Copolymer | Aqueous solution F | 0.0% | 2.7% | A |
| Example 7 | CMC | Aqueous solution G | 0.0% | 0.0% | A |
| Example 8 | Copolymer | Slurry A | 0.0% | 6.7% | A |
| Comp. Ex. 1 | Copolymer | Aqueous solution H | 23.5% | 114.0% | B |
| Comp. Ex. 2 | Copolymer | Aqueous solution I | 11.1% | 31.7% | B |
| Comp. Ex. 3 | Copolymer | Aqueous solution J | 19.0% | 17.3% | B |
| Comp. Ex. 4 | Copolymer | Aqueous solution K | 245.7% | 184.8% | B |
| Comp. Ex. 5 | Copolymer | Aqueous solution L | 97.5% | 240.0% | B |
| Comp. Ex. 6 | CMC | Aqueous solution M | 18.5% | 58.0% | B |
| Reference Example 1 | Polyacrylic acid | Aqueous solution N | 20.4% | 0.0% | A |
| Reference Example 2 | Polyacrylic acid | Aqueous solution O | 0.0% | 0.0% | A |
| Comp. Ex. 7 | Copolymer | Slurry B | 16.7% | 185.7% | B |

The invention claimed is:

1. A composition in the form of an aqueous solution comprising (A) a copolymer of vinyl alcohol and an alkali metal neutralized product of ethylenically unsaturated carboxylic acid and/or (B) carboxymethyl cellulose or a salt thereof,
wherein when the viscosity of the composition after being diluted with water (25° C. or less) to a viscosity of 200±100 mPa·s at room temperature (25° C.) and adjusted to a temperature of 25° C. is defined as $X^{a1}$ (Pa·s), and the viscosity of the composition after being placed in an airtight container and allowed to stand at 95° C. for 8 hours is defined as $X^{b1}$ (Pa·s), the change rate obtained by the following formula is 0 to 10%:

Change rate (%)=($X^{a1}$−$X^{b1}$)/$X^{b1}$×100, wherein the viscosities used to calculate the change rate are values measured using a Brookfield viscometer at 30 rpm and a liquid temperature of 25° C.

2. A composition in the form of a slurry comprising:
(A) a copolymer of vinyl alcohol and an alkali metal neutralized product of ethylenically unsaturated carboxylic acid and/or (B) carboxymethyl cellulose or a salt thereof;
water; and
an active substance and/or a filler,
wherein when the viscosity of the composition after being diluted with water (25° C. or less) to a viscosity of 1000±900 mPa·s at room temperature (25° C.) and adjusted to a temperature of 25° C. is defined as $X^{a2}$ (Pa·s), and the viscosity of the composition after being placed in an airtight container and allowed to stand at 95° C. for 8 hours is defined as $X^{b2}$ (Pa·s), the change rate obtained by the following formula is 0 to 10%:

Change rate (%)=($X^{a2}$−$X^{b2}$)/$X^{b2}$×100, wherein the viscosities used to calculate the change rate are values measured using a Brookfield viscometer at 30 rpm and a liquid temperature of 25° C.

3. A composition comprising:
(A) a copolymer of vinyl alcohol and an alkali metal neutralized product of ethylenically unsaturated carboxylic acid and/or (B) carboxymethyl cellulose or a salt thereof; and water,
wherein when the viscosity of the composition after being adjusted to a temperature of 25° C. is defined as $X^c$ (Pa·s) and the viscosity of the composition after being placed in an airtight container after the adjustment to 25° C. and being allowed to stand at 25° C. for 3 days is defined as $X^d$ (Pa·s), the viscosity increase obtained by the following formula is 0 to 10%:

Viscosity increase (%)=$(X^d-X^c)/X^c \times 100$, wherein the viscosities used to calculate the viscosity increase are values measured using a Brookfield viscometer at 30 rpm and a liquid temperature of 25° C.

4. The composition according to claim 3, which is a composition in the form of an aqueous solution comprising (A) a copolymer of vinyl alcohol and an alkali metal neutralized product of ethylenically unsaturated carboxylic acid and/or (B) carboxymethyl cellulose or a salt thereof.

5. The composition according to claim 3, which is a composition in the form of a slurry comprising:
(A) a copolymer of vinyl alcohol and an alkali metal neutralized product of ethylenically unsaturated carboxylic acid and/or (B) carboxymethyl cellulose or a salt thereof;
water; and
an active substance and/or a filler.

6. The composition according to claim 2, wherein the active material and/or the filler is at least one member selected from the group consisting of electrode active materials, inorganic fine particles, and organic fine particles.

7. The composition according to claim 1, which is a binder composition for secondary batteries.

8. The composition according to claim 2, which is an electrode mixture composition for secondary batteries or a separator composition for secondary batteries.

9. The composition according to claim 1, wherein the copolymer of vinyl alcohol and an alkali metal neutralized product of ethylenically unsaturated carboxylic acid has a molar ratio of the vinyl alcohol to the alkali metal neutralized product of ethylenically unsaturated carboxylic acid in the copolymer in the range of 95/5 to 5/95.

10. The composition according to claim 1, wherein the alkali metal neutralized product of ethylenically unsaturated carboxylic acid is an alkali metal acrylate and/or an alkali metal methacrylate.

11. The composition according to claim 1, wherein the carboxymethyl cellulose has a degree of etherification of 0.8 to 1.2.

12. The composition according to claim 2, wherein the copolymer of vinyl alcohol and an alkali metal neutralized product of ethylenically unsaturated carboxylic acid has a molar ratio of the vinyl alcohol to the alkali metal neutralized product of ethylenically unsaturated carboxylic acid in the copolymer in the range of 95/5 to 5/95.

13. The composition according to claim 2, wherein the alkali metal neutralized product of ethylenically unsaturated carboxylic acid is an alkali metal acrylate and/or an alkali metal methacrylate.

14. The composition according to claim 2, wherein the carboxymethyl cellulose has a degree of etherification of 0.8 to 1.2.

15. The composition according to claim 3, wherein the copolymer of vinyl alcohol and an alkali metal neutralized product of ethylenically unsaturated carboxylic acid has a molar ratio of the vinyl alcohol to the alkali metal neutralized product of ethylenically unsaturated carboxylic acid in the copolymer in the range of 95/5 to 5/95.

16. The composition according to claim 3, wherein the alkali metal neutralized product of ethylenically unsaturated carboxylic acid is an alkali metal acrylate and/or an alkali metal methacrylate.

17. The composition according to claim 3, wherein the carboxymethyl cellulose has a degree of etherification of 0.8 to 1.2.

18. A slurry comprising the composition according to claim 1 and an electrode active material.

19. A slurry comprising the composition according to claim 1 and filler particles.

20. A method of producing an electrode of non-aqueous electrolyte secondary batteries, comprising:
applying the slurry according to claim 18 to a current collector.

21. A method of producing a non-aqueous electrolyte secondary battery separator, comprising:
applying the slurry according to claim 19 to a support.

* * * * *